United States Patent [19]

Lockshaw

[11] 4,169,793
[45] Oct. 2, 1979

[54] TANK DRAIN ASSEMBLY FOR SWIMMING POOL FILTERS

[75] Inventor: James J. Lockshaw, Huntington Beach, Calif.

[73] Assignee: Tolo, Incorporated, Santa Ana, Calif.

[21] Appl. No.: 814,176

[22] Filed: Jul. 11, 1977

[51] Int. Cl.² ............... E04H 3/20; B01D 29/08
[52] U.S. Cl. ................... 210/169; 210/238; 210/288; 285/319
[58] Field of Search ........... 210/288, 289, 291, 169, 210/238; 285/319, 423, DIG. 22

[56] References Cited

U.S. PATENT DOCUMENTS

| 2,098,903 | 11/1937 | Slidell | 210/291 X |
| 2,768,750 | 10/1956 | Krayzer | 210/291 X |
| 3,245,703 | 4/1966 | Manley | 285/319 |
| 3,625,365 | 12/1971 | Armstrong | 210/289 |
| 3,747,768 | 7/1973 | Barrera | 210/289 |
| 3,810,073 | 5/1974 | Zajac et al. | 285/319 |
| 3,908,925 | 9/1975 | Rinkleib et al. | 285/319 |
| 3,937,547 | 2/1976 | Lee-Kemp | 285/319 |
| 4,026,581 | 5/1977 | Pasbry | 285/319 |

Primary Examiner—Theodore A. Granger
Attorney, Agent, or Firm—Louis J. Bachand

[57] ABSTRACT

A tank drain assembly for swimming pool filters is provided characterized by an improved locking and orienting structure individually locking collector tubes into their respective sockets in the manifold surrounding the common drain port of the filter tank, each such structure comprising spring finger means segmentally formed on the socket end of the tubes, and a finger receiving recess within the tube socket sized and located to operatively orient the tube apertures responsive to receiving the finger means in tube locking relation.

8 Claims, 9 Drawing Figures

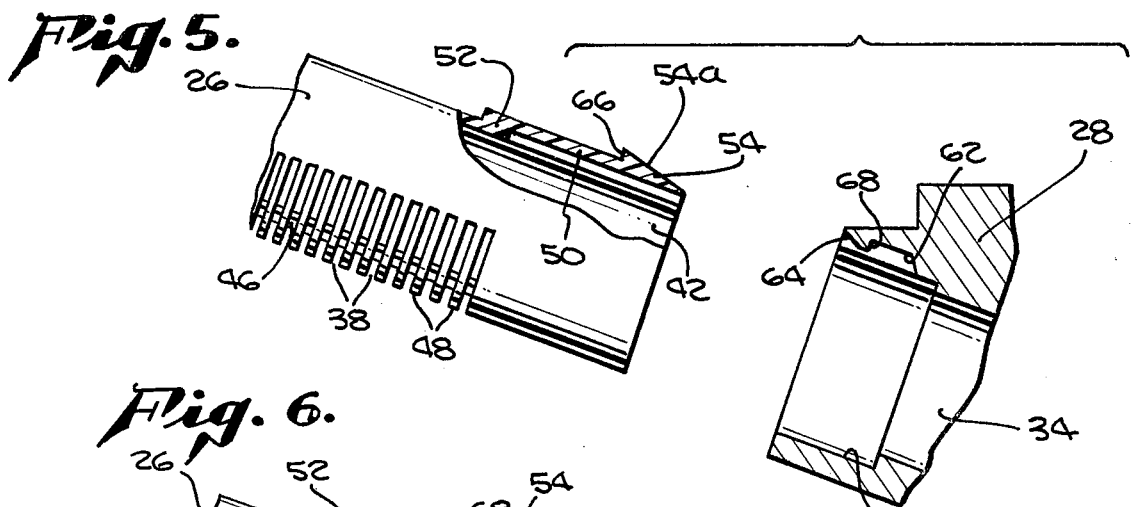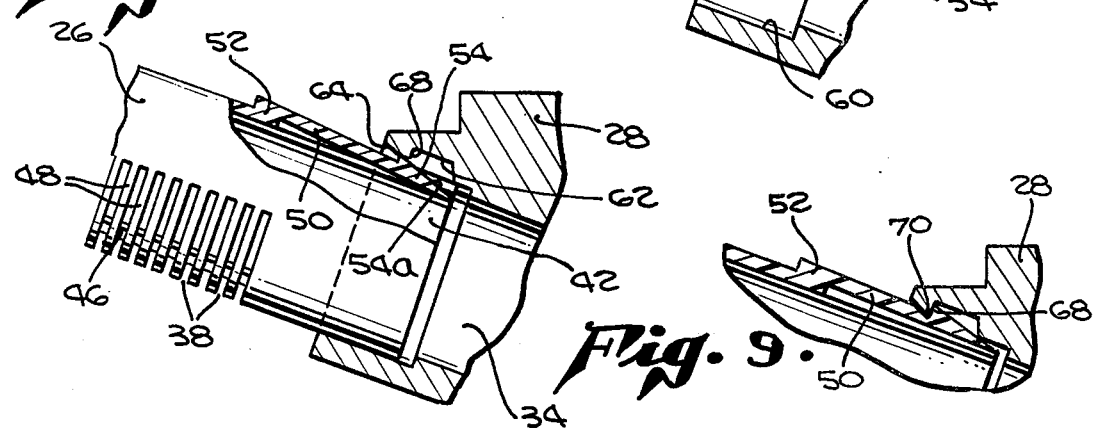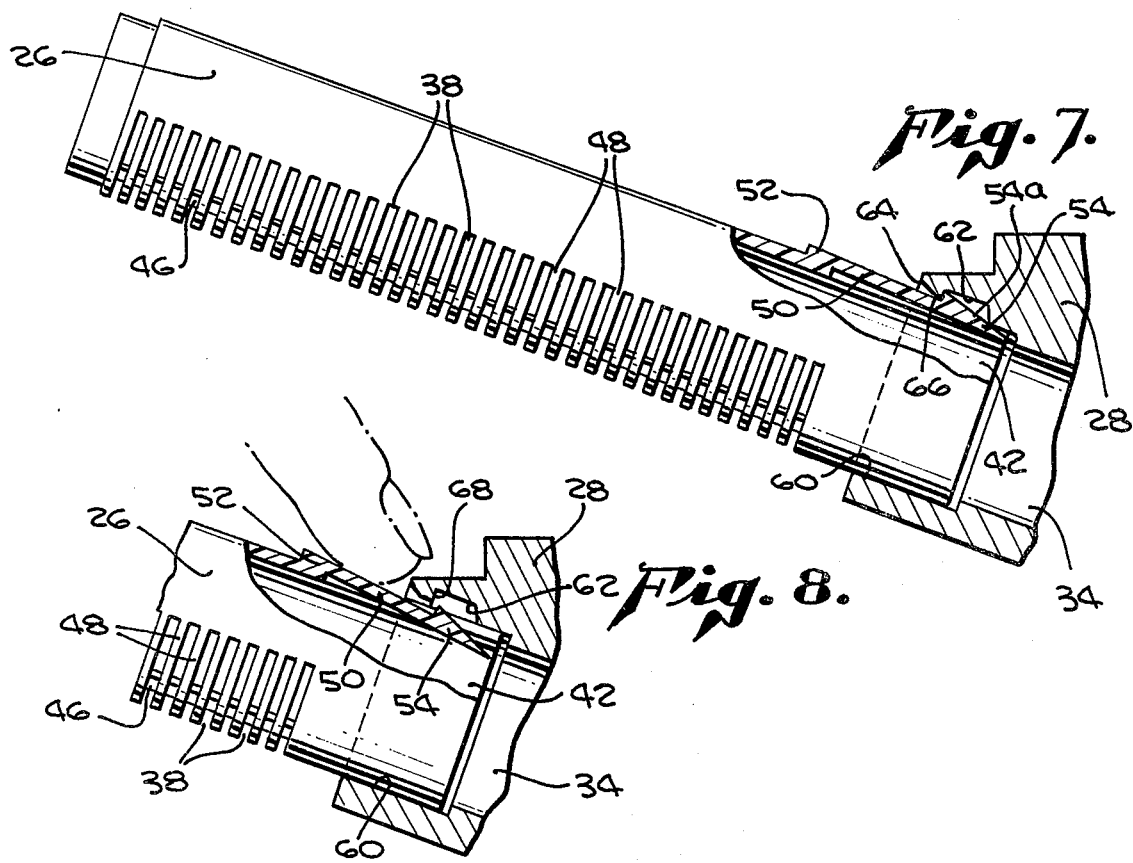

TANK DRAIN ASSEMBLY FOR SWIMMING POOL FILTERS

BACKGROUND OF THE INVENTION

This invention has to do with tank drain assemblies particularly suited to swimming pool filter applications and other applications where a particulate, regenerable filtering medium is disposed in a tank and a series of collector tubes extend into the filtering medium to collect filtered water therein for conveyance to a common drain port. More particularly, the invention is concerned with an improvement in the locking structure holding such collector tubes to the manifold surrounding the common drain port.

Swimming pool filters and like filters for substantially continuous use in filtering an aqueous medium comprise a tank having an inlet at the top and an outlet or common drain port at the bottom. Disposed within the tank is a filtering medium such as sand or diatomaceous earth. The water is spread upon the bed of filtering medium and percolates through the medium, giving up particulate and gelatinous contaminants in the process. A series of collector tubes are provided, distributed through the filtering medium, their perforate sides downward to preclude blocking by the filtering medium and to receive filtered water. These collector tubes are connected and held in radial relation to the filter tank by a common port manifold wall which combines the filtered fluid from the several collector tubes and conveys it to the common port for recirculation back to the swimming pool or other use. Such filters are periodically regenerable by backwashing, in which operation water is reversed through the system to flush contaminants from the filtering medium to waste.

It often occurs, during original installation or during replacement of the filtering medium after substantial periods of use, that the collector tubes, which are generally fabricated of a plastic material impervious to chemicals and water, are broken or damaged during the course of handling of the equipment or pouring of heavy sand into the filter tank. When a collector tube is broken off, it generally is broken off at the inner end, that is, the end which is held in the socket of the drain port manifold.

PRIOR ART

In the past, it has been the practice to thread-connect the collector tube inner terminals with the manifold wall by a simple screwing operation into threaded openings which define the manifold wall sockets. When a tube collector breaks, removal of the threaded stub from within the manifold wall socket is an arduous procedure and can result in further damage to the socket threads themselves if not carried out carefully. Damaged threads, of course, will preclude an effective coupling of the next or replacement collector tube inserted into the socket, if indeed the condition of the threads will permit secure connection at all.

Further, the alignment of collector tubes within the filtering medium is of importance to proper operation of the filter tanks. Collector tubes conventionally have a series of apertures formed as a series along the underside thereof, e.g. as a succession of radial kerfs formed in the underside wall of the collector tube. These apertures are downwardly turned to prevent unwanted incursion of sand or other filtering medium into the collector tube for eventual carriage through to the swimming pool. If the tube threading connection is not properly begun, the tube, when fully thread connected, is not properly oriented and additional labor is required to insure proper orientation of the tubes or a deficient filter operation will result.

The problem of orienting collector tubes properly in the field, of course, is even more difficult than original equipment manufacturing problems in collector tube orientation.

SUMMARY OF THE INVENTION

It is accordingly a major objective of the present invention to provide an improvement in tank drain assemblies for swimming pool filters. It is a further objective to provide an improved locking and orienting structure for tank drain assemblies. It is a further object to provide in a collector tube locking and orienting structure spring finger means and cooperating finger receiving recesses in the manifold wall sockets which co-act to both lock and orient the collector tube. It is a still further object of the invention to provide for ready release of the collector tube from its locked engagement for ease of replacement of all or part of the tube. It is a further objective of the invention to provide for collector tube structure which is readily manufactured at a low cost and with a high degree of reliability.

These and other objectives of the invention are realized in a tank drain assembly for conveying filtered water simultaneously from a plurality of circularly spaced locations in a particulate filtering medium disposed within a swimming pool filter tank and to a common drain port beyond the medium, in which the assembly comprises a manifold interiorly open to the drain port, and a plurality of circularly distributed collector tubes projecting radially from sockets formed in the wall of the manifold, each such tube having a longitudinally extended series of coplanar apertures therein normally opening downwardly in their operative orientation to communicate the filtering medium locations with the drain port; wherein there is provided the improvement of a locking and orienting structure individually locking the tubes into their respective sockets preferentially in their operative orientation, each such structure comprising spring finger means segmentally formed on the socket end of the tube, and a finger receiving recess within the tube socket sized and located to operatively orient the tube apertures responsive to receiving the finger means in tube locking relation.

Typically, the tube openings are parallel, semi-circular cuts in co-axial series along the tube; the spring finger defines a radial detent adapted to interfit the socket recess in tube locking relation; and the spring finger means and the aperture series are located on diametrically opposite sides of the tube.

More particularly, the spring finger means may comprise a circularly noncoplanar terminal segment of the collector tube having a detent button adjacent the free end of the segment radially projecting beyond the plane of said segment in tube recess interfitting relation and a segment shoulder connecting the segment to the collector tube in pivoting relation to selectively interfit the detent button with the tube recess.

The manifold wall socket typically is axially extended and radially relieved along its axial extent to define the mentioned recess inwardly of the mouth of the socket a distance proportioned to accommodate the segment location of the detent button; the segment being recessed opposite the socket mouth forming wall portion to interfit therewith in segment stress-relieving relation.

In particular embodiments, the collector tubes comprise a synthetic organic thermoplastic polymer and the mentioned tank draing assembly is combined with a particulate filtering medium receiving swimming pool filter tank.

BRIEF DESCRIPTION OF THE DRAWINGS

The invention will be further described as to an illustrative embodiment thereof in conjunction with the attached drawings in which:

FIG. 5, FIG. 6 and FIG. 7 show respectively progressive insertion of a collector tube into the manifold wall socket in tube blocking and orienting relation;

FIG. 8 shows the collector tube being removed from the wall socket by operation of the blocking means; and FIG. 9 is a fragmentary view of an alternate form of the collector tube.

DESCRIPTION OF THE PREFERRED EMBODIMENT

Figure 1:
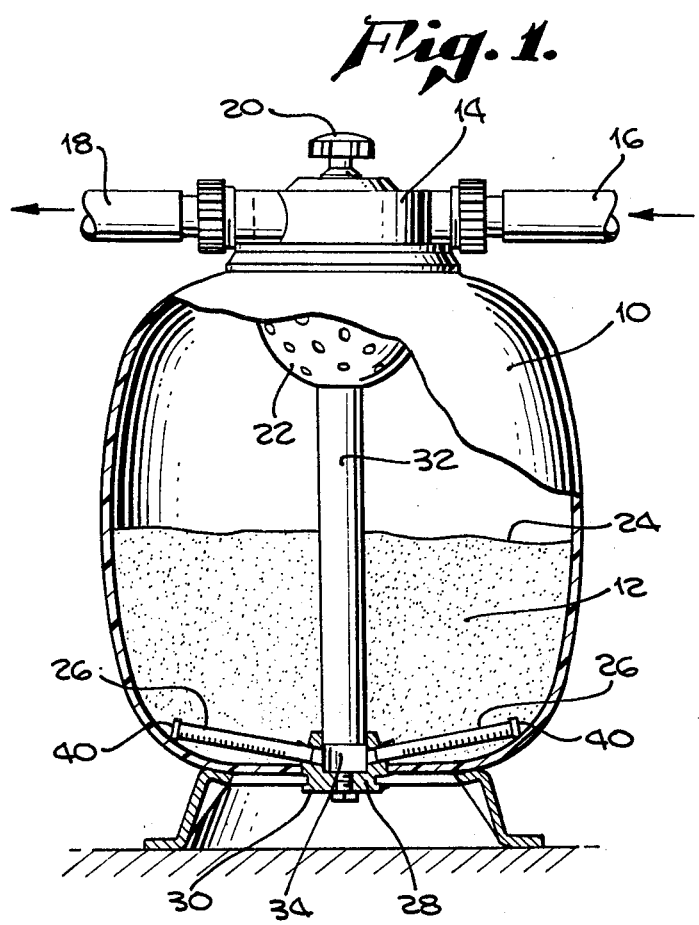
FIG. 1 is a front elevational view partly broken away to show underlying parts of a swimming pool filter tank having a multi-port inlet/outlet combination valve on top and an improved tank drain assembly on the bottom thereof.

With reference now to the drawings in detail, FIG. 1 depicts a generally conventional swimming pool filter tank 10 partially filled with filter medium 12, surmounted by a multi-port valve 14 connected by inlet pipe 16 to the pool pump (not shown) and by outlet pipe 18 to the pool return line (not shown). Other pipe connections are not shown. Rotation of handle 20 selects the mode of filter tank operation by coupling one or another of the several pipes, e.g. 16, 18 together. Incoming water is dispersed by the diffuser basket 22 to pass onto the filter medium 12 distributively across the medium upper surface 24. This water to be filtered passes through the filter medium giving up its contaminants. Filtered water reaching the bottom of the tank 10 is collected in plural collector tubes 26 extending radially within the tank from a manifold body 28 which is integrated with the end closure 30 for the tank 10. A riser 32 communicates the manifold body interior 34, which receives water from collector tubes 26, with the tank outlet represented by pipe 18, and through top mounted valve 14.

Thus far described, the tank 10 is conventional. It is to be noted particularly that the collector tubes 26 (FIG. 2) have a series of coaxial kerfs 36 formed in the underside thereof to define water receiving apertures 38 or flow passages, and too that these apertures are downward opening into the filter medium against gravity induced reception of sand or other filter medium. Thus oriented the collector tubes 26 collect water from plural circularly spaced and distributed locations within the tank.

The proper orientation of the collector tube 26 upon original installation and in the course of replacement, and the ease of insertion and removal of such tubes, are major desiderata of this invention.

Figure 3:
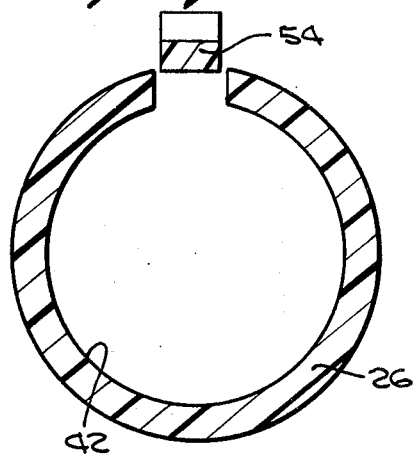
FIG. 3 is a transverse sectional view taken on line 3—3 in FIG. 2.
Figure 4:
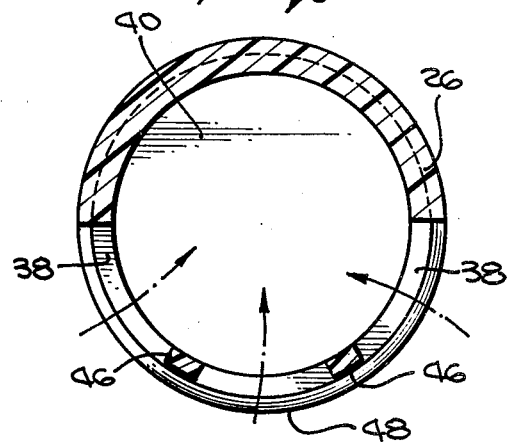
FIG. 4 is a transverse sectional view taken on line 4—4 in FIG. 2.
Figure 2:
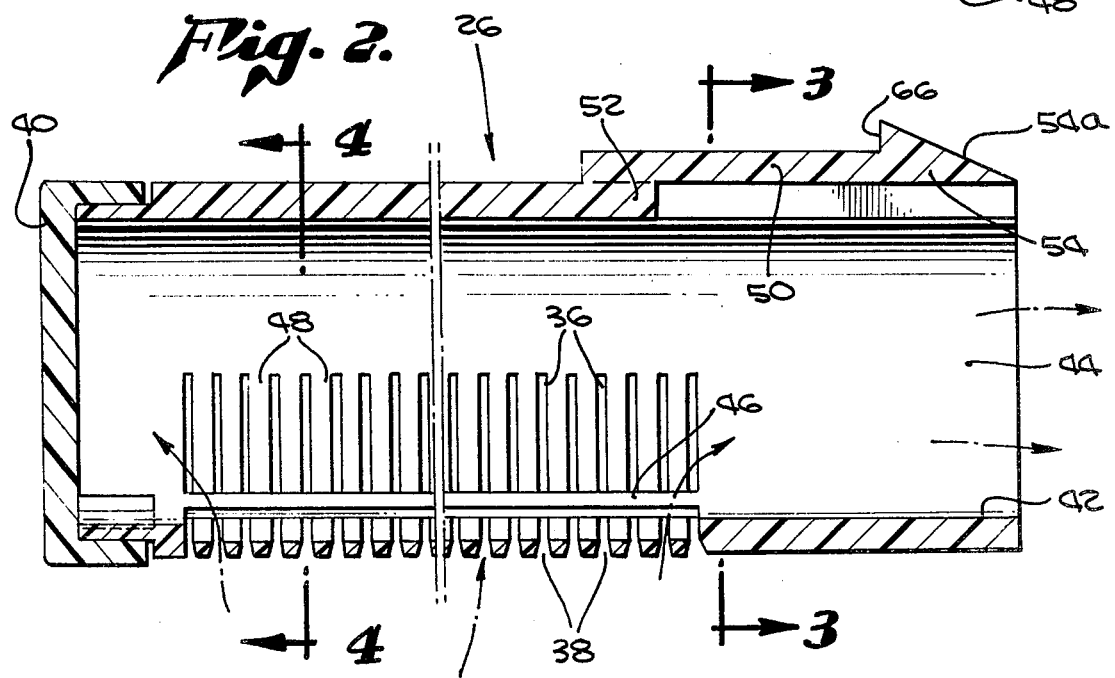
FIG. 2 is a vertical sectional view of a collector tube according to the invention.

To that end and with reference particularly to FIGS. 2, 3 and 4, the collector tube 26 according to the invention comprises an axially elongated tube of synthetic organic plastic such as ABS, polyethylene, polypropylene or the like closed at its outer opening by cap 40 and open at its inner end 42. Between the inner and outer ends a series of kerfs 36 are formed paraxial with each other, coplanar and coaxial with the tube axis 44. These kerfs 36 may be formed with a reinforcing strip 46 supporting their divider members 48 as shown. Water inflow through apertures 38 is conventional.

The tube inner end 42 is specially formed in this invention. Initially with reference to FIG. 3, it will be observed that a longitudinal segment of the tube periphery is radially offset to be circularly nonplanar with the remainder of the tube, thus providing a finger 50 from an inward shoulder 52 of the tube end 42 to the tube end itself. Because of its solely shoulder connection at 52, finger 50 is terminally free to flex in and out of the annular plane of the tube 26. Finger 50 further has formed thereon a slope shouldered detent, button 54 tapered toward the adjacent terminus of the tube 26 and arranged so that downward digital pressure (cf. FIG. 8) displaces the detent as the finger 50 pivots resiliently about its tube connection at shoulder 52.

Operation of the new tube 26 locking and orienting structure will be evident from a consideration of FIGS. 5-8.

First it will be observed that tube receiving socket 60 formed in the manifold body 28 to receive the inner tube end 42 is free of the screw threads usually found there and that instead a single cavity 62 is formed as a radial recess of limited depth and width (cf. FIG. 7) in the socket wall, sized to engage snugly against angular or longitudinal movement of the detent 54 therein. A ramp 64 complimentary to sloped surface 54a of detent 54 is formed outward of the cavity 62 to facilitate coupling, as will be seen.

To insert and lock a collector tube 26 and simultaneously ensure the proper operative orientation thereof, and with reference to FIGS. 6 and 7, the tube inner end 42 is pressed into socket 60 until the detent 54 slides past ramp 64 and the detent snaps into cavity 62. Since cavity 62 has little more circular extension than the detent 54 has width, the fit is immediate, firm, and it will be noted self-orienting, since only proper alinement of the detent and recess will provide coupling and a coupling per se ensures proper alinement. The detent face 66 engages the opposing wall portion 68 of the socket 60. In an alternative form of the invention, shown in FIG. 9, a recess 70 is provided to receive wall portion 68 and reduce the stress on finger 50 over long term periods to lengthen use life of the tube 26.

Removal of the tube 26 or the stub thereof should the tube become broken is readily accomplished, see FIG. 8, by depressing the finger 50 between shoulder 52 and detent 54, thereby deflecting the face 66 of the detent 54 out of socket wall portion 68 engagement, whereby the tube 26 or remainder portion thereof, if the tube has been broken, can be readily withdrawn.

It is thus evident that the invention provides an advantageous collector tube structure which is quick fitting and properly self-orienting when installed and readily removed for service or replacement without possibility of socket damage.

I claim:

1. In a tank drain assembly for conveying filtered water simultaneously from a plurality of circularly spaced locations in a particulate filtering medium disposed within a swimming pool filter tank and to a common drain port beyond said medium, said assembly comprising a manifold interiorly open to said drain port, and a plurality of circularly distributed collector tubes projecting radially from sockets formed in the wall of said manifold, each said tube having a longitudinally extended series of coplanar apertures therein normally opening downwardly in their operative orientation to communicate said filtering medium locations with said drain port; the improvement of a self-locking and orienting structure cooperatively defined by said tubes and sockets for individually locking said tubes into their respective sockets preferentially in said operative orientation, each said structure comprising spring finger means segmentally formed on the socket end of said tube, and defining an outwardly projecting radial detent at the free end thereof and an inwardly opening finger receiving recess within the tube socket sized to engage said detent snugly against angular and longitudinal movement and located so as to operatively downwardly orient said tube apertures responsive to engagement of said finger means detent in said recess in tube internal self-locking relation.

2. Tank drain assembly according to claim 1 in which said tube apertures are parallel, semicircular cuts in coaxial series along said tube.

3. Tank drain assembly according to claim 1 in which said spring finger means and said aperture series are located on diametrically opposite sides of said tube.

4. Tank drain assembly according to claim 3 in which said spring finger means comprises a circularly noncoplanar terminal segment of said collector tube, said detent comprises an outwardly projecting button radially beyond the plane of said segment and including also a segment shoulder connecting said segment to the collector tube in pivoting relation for selectively interfitting said detent button with said tube recess.

5. Tank drain assembly according to claim 4 in which said manifold wall socket is axially extended and radially relieved along its axial extent to define said recess inwardly of the mouth of said socket at a distance proportioned to accommodate the segment location of said detent button.

6. Tank drain assembly according to claim 5 in which said segment is recessed opposite the socket mouth forming wall portion to interfit therewith in segment stress-relieving relation.

7. Tank drain assembly according to claim 5 in combination with a particulate filtering medium receiving swimming pool filter tank.

8. Tank drain assembly according to claim 5 in which said tube comprises synthetic organic thermoplastic polymer.

* * * * *